March 17, 1925.
M. SCHWARTZ
BUSHING STRUCTURE
Filed Dec. 10, 1923
1,529,929
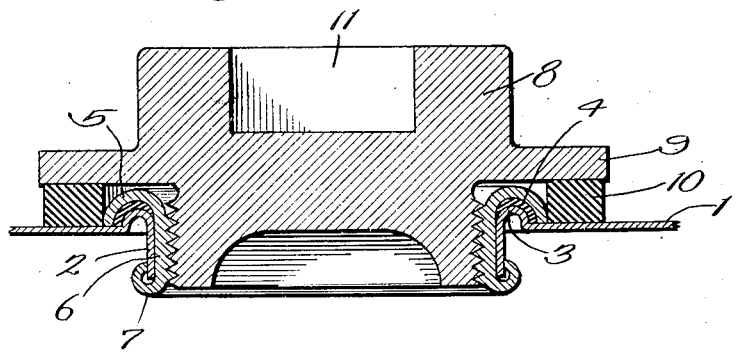
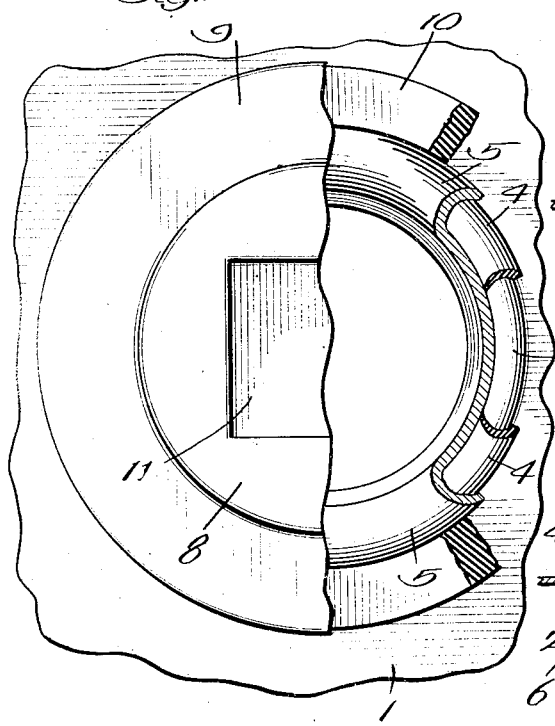
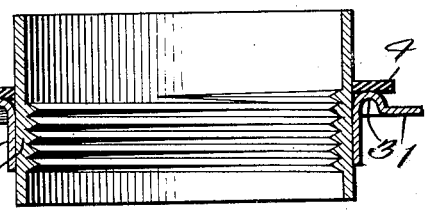
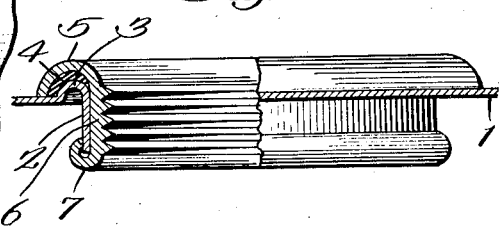
Inventor:
Morris Schwartz Patented Mar. 17, 1925.

1,529,929

UNITED STATES PATENT OFFICE.

MORRIS SCHWARTZ, OF CHICAGO, ILLINOIS, ASSIGNOR OF ONE-HALF TO WINNIFRED B. PARISH, OF CHICAGO, ILLINOIS.

BUSHING STRUCTURE.

Application filed December 10, 1923. Serial No. 679,794.

*To all whom it may concern:*

Be it known that I, MORRIS SCHWARTZ, a citizen of the United States, residing at Chicago, in the county of Cook and State of Illinois, have invented a certain new and useful Improvement in Bushing Structures, of which the following is a full, clear, concise, and exact description.

My invention relates to bushings and the assembly thereof with the apertured bodies through which they pass and has for its object the provision of means for rendering fluid tight the union between the bushings and their supporting bodies.

In accordance with one feature of my invention the supporting body carries a tubular portion and a bead or ridge at the base of said tubular portion. There is a gasket which overlies the bead and the bushing is formed with a curled flange which encloses the gasket and clamps it against the bead.

In accordance with another feature of the invention, one end of the bushing is curled over the end of a tubular portion provided upon the object receiving the bushing to clamp this tubular portion between the body of the bushing and the annular termination of its curled portion further to render fluid tight the union between the bushing and the body receiving it.

In the preferred embodiment of the invention the body which carries the tubular portion is integrally formed therewith and with the bead out of sheet material such as sheet steel, the bead joining the base of the tubular portion and bulging from the side of the sheet body that is opposite the free end of the tubular portion. Such a structure as this is well adapted in the making of barrels, the bushing defining the bung hole of the barrel and being desirably interiorly threaded to receive an exteriorly threaded bung. This bung is preferably formed with a flange that extends radially beyond the bead, another gasket being interposed between the sheet body and the flange of the bung to seal the union between the bung and barrel.

The invention will be more fully explained by reference to the accompanying drawing in which Fig. 1 is an axial sectional view illustrating a bung and bung hole structure as made in accordance with the preferred embodiment of the invention; Fig. 2 is an exterior view of the structure shown in Fig. 1 with parts broken away; Fig. 3 is an axial sectional view illustrating the initial assembly of barrel wall, bushing and the gasket pertaining thereto before the bushing is flanged; and Fig. 4 is a view somewhat similar to Fig. 1 except that the bung and the gasket pertaining to the bung are absent and part of the structure is shown in elevation.

Like parts are indicated by similar characters of reference throughout the different figures.

The barrel wall or other supporting body 1 is preferably formed of sheet material such as steel. It carries a tubular portion 2 which is preferably integrally formed therewith and projects therethrough. The body 1 is formed with an annular bead or ridge 3 which bulges from the side of the body that is opposite the free end of the tubular portion, meaning that end of this portion which is opposite the end thereof that is joined with the body by the bead. The sealing gasket 4 overlies the bead and is clamped against the same, to be in fluid tight union therewith, by means of the curled annular flange 5 of a bushing 6.

Fig. 3 illustrates the preferred method of assembling the parts so far specifically described. As shown in this figure, the gasket 4 is initially in the form of a flat ring and the bushing is the short section of a straight tube. The ring is placed against the outer or convex side of the bead and the bushing has both of its ends curled to form at one end the flange 5 and at its other end the flange 7, this latter flange enclosing the edge portion of the free end of the tubular portion and firmly pressing the circular edge against the tubular portion and clamping this tubular portion against the body of the bushing. The circular edge of the curled flange 7 has uniformly close fit against the tubular portion and this tubular portion has uniformly close fit with the body of the bushing, to render more fluid tight the union of the bushing and the body receiving it. In the process of forming the flanges sufficient pressure is axially exerted to firmly compress the gasket 4 between the curled flange 5 and the bead 3. I do not wish to be limited, however, to the termination of the bushing at the free end of the tubular portion 2 in all embodiments of the invention. Where the bore of the bushing is to constitute a bung hole or other plug receiving opening, the bushing is preferably formed upon the bung 8. In order to render fluid tight the union between the bung and bushing I desirably form the bung with a flange 9 that projects radially beyond the flange 5 sufficiently to permit of the reception of another gasket 10 between the flange 9 and the body 1.

Any suitable formation may be provided upon the bung whereby it may be screwed or unscrewed. In the embodiment of the invention shown the bung is formed with a central square recess 11 which may receive a correspondingly shaped wrench plug.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a body of sheet material having a tubular portion integrally formed therewith and projecting therethrough and formed with a bead bulging from the side thereof that is opposite the free end of said tubular portion and which bead joins the base of the tubular portion with the surrounding portion of said body; of a sealing gasket overlying said bead; and a bushing within the bore of said tubular portion and formed with curled flanges at its ends, one of the flanges enclosing said gasket and the other enclosing the edge of the free end of the tubular portion, both flanges co-operating to bring the gasket into sealing engagement with the bead and the flange enclosing the gasket.

2. The combination with a body of sheet material having a tubular portion integrally formed therewith and projecting therethrough and formed with a bead bulging from the side thereof that is opposite the free end of said tubular portion and which bead joins the base of the tubular portion with the surrounding portion of said body; of a sealing gasket overlying said bead; and a bushing within the bore of said tubular portion and formed with curled flanges at its ends, one of the flanges enclosing said gasket and the other engaging the edge of the free end of the tubular portion, both flanges co-operating to bring the gasket into sealing engagement with the bead and the flange enclosing the gasket.

In witness whereof I hereunto subscribe my name this 14th day of March A. D., 1923.

MORRIS SCHWARTZ.